(12) United States Patent
Cohen et al.

(10) Patent No.: US 11,157,232 B2
(45) Date of Patent: Oct. 26, 2021

(54) INTERACTION CONTEXT-BASED CONTROL OF OUTPUT VOLUME LEVEL

(71) Applicant: International Business Machines Corporation, Armonk, NY (US)

(72) Inventors: Eyal Cohen, Zichron Yaacov (IL); Lior Limonad, Nesher (IL); Roy Abitbol, Zurit (IL)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 16/365,684

(22) Filed: Mar. 27, 2019

(65) Prior Publication Data
US 2020/0310742 A1 Oct. 1, 2020

(51) Int. Cl.
*G10L 15/00* (2013.01)
*G06F 3/16* (2006.01)
*G10L 15/22* (2006.01)
*G10L 13/00* (2006.01)
*G10L 13/04* (2013.01)
*G10L 15/02* (2006.01)

(52) U.S. Cl.
CPC .............. *G06F 3/165* (2013.01); *G10L 15/22* (2013.01); *G10L 13/00* (2013.01); *G10L 13/04* (2013.01); *G10L 15/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,035,273 A * | 3/2000 | Spies | ................ | G10L 15/07 704/235 |
| 7,881,934 B2 | 2/2011 | Norikazu et al. | | |
| 8,340,975 B1 * | 12/2012 | Rosenberger | .......... | G10L 15/22 704/275 |
| 9,549,068 B2 | 1/2017 | Krishnan et al. | | |
| 10,514,888 B1 * | 12/2019 | Rodgers | ................ | G10L 25/78 |
| 2013/0257780 A1 * | 10/2013 | Baron | ................ | G10L 15/22 345/173 |
| 2014/0372109 A1 * | 12/2014 | Iyer | ......................... | H03G 3/32 704/225 |
| 2016/0372110 A1 | 12/2016 | Waltermann et al. | | |

(Continued)

OTHER PUBLICATIONS

Mishaal Rahman, Set a Separate Volume Level for Google Assistant with this Free App, https://www.xda-developers.com/set-separate-volume-level-google-assistant-free-app/, Jun. 8, 2017 4:30pm.

(Continued)

*Primary Examiner* — Vu B Hang
(74) *Attorney, Agent, or Firm* — Ziv Glazberg

(57) ABSTRACT

A method, apparatus and product for interaction context-based control of output volume level. The method comprising: obtaining a vocal input from a user, wherein the vocal input is part of an interaction between the user and the voice-based interaction agent; determining an interaction context of the interaction between the user and the voice-based interaction agent; determining an output volume level of the voice-based interaction agent based on the interaction context; and providing to the user an output of the voice-based interaction agent, wherein the output comprises a voice-based output having a volume level of the output volume level.

18 Claims, 4 Drawing Sheets

(56) References Cited

U.S. PATENT DOCUMENTS

2016/0379638 A1* 12/2016 Basye .................... G10L 15/18
                                                    704/235
2017/0289766 A1* 10/2017 Scott .................... H04W 4/023
2018/0033424 A1   2/2018 Pechanec et al.
2020/0110572 A1*  4/2020 Lenke .................... G06F 3/167

OTHER PUBLICATIONS

Onno Kampman, Adapting a Virtual Agent to User Personality, Lecture Notes in Electrical Engineering, v. 510, 2019, p. 111-118.
Anonymous, Polite mode for a virtual assistant, An IP.com Prior Art Database Technical Disclosure, IP.com No. IPCOM000253201D, IP.com Electronic Publication Date: Mar. 14, 2018.

* cited by examiner

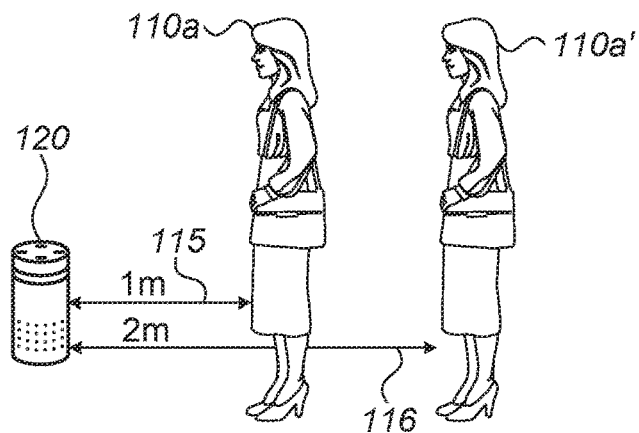
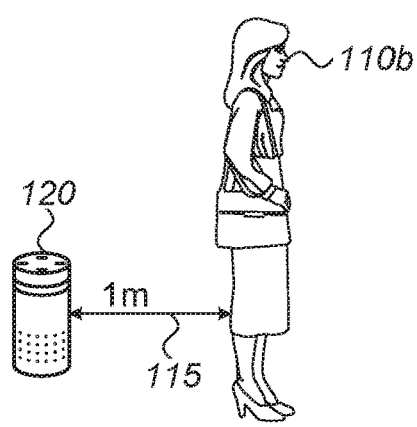
Fig. 1A
Fig. 1B
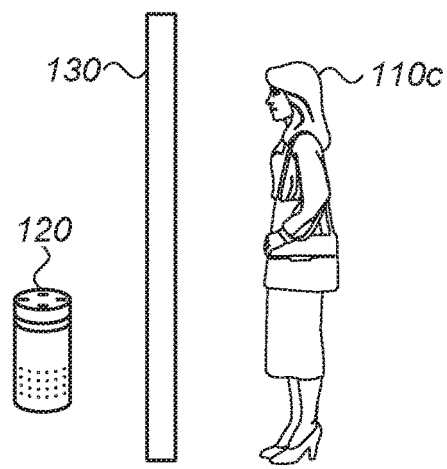
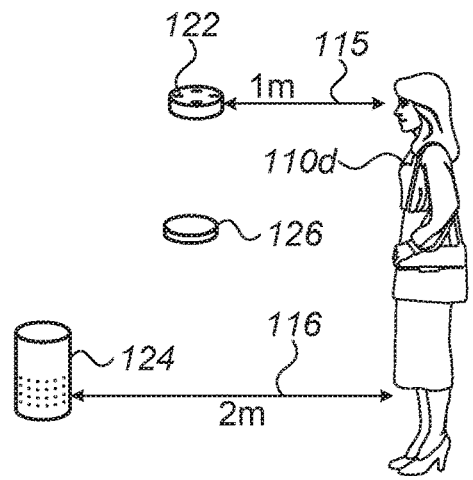
Fig. 1C
Fig. 1D
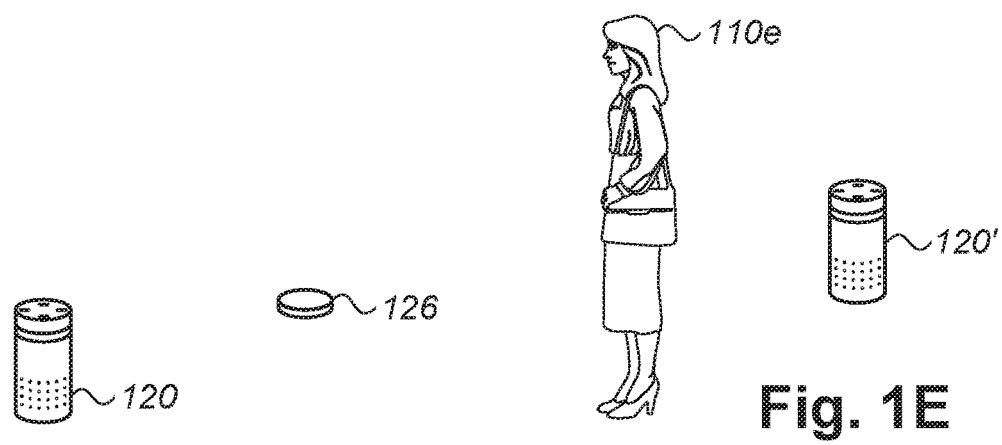
Fig. 1E

INTERACTION CONTEXT-BASED CONTROL OF OUTPUT VOLUME LEVEL

TECHNICAL FIELD

The present disclosure relates to virtual assistants in general, and to adaptive output volume level of the virtual assistants, in particular.

BACKGROUND

Virtual assistants are able to send e-mails, manage to do list and calendars based on verbal input and commands. A human user can talk to the virtual personal assistant in order to achieve any of the above tasks, and others. Virtual personal assistants may be found in smartphones such as the case with APPLE™'s SIRI™ that is available on IPHONE™, ALEXA™ that is available on ECHO™, GOOGLE ASSISTANT™ that is available on ANDROID™ devices and on GOOGLE HOME™.

In some cases, virtual assistants are also integrated into other devices. One notable example is the smart speaker, providing for a voice-based only interface of the user with the virtual assistant. For example, ECHO™, and GOOGLE HOME™ receive voice commands of the user and provide vocal output in response, using the respective software-based virtual assistant, ALEXA™ and GOOGLE ASSISTANT™, respectively.

With the progress in machine learning and artificial intelligent virtual personal assistants are becoming better and better. Virtual personal assistants can search the web, are integrated with smart homes and can even order a pizza or a taxi. Virtual personal assistants are able to personalize their outputs based on the personal data of the user, such as her address book, calendar meetings, or the like. With the increase in utility of virtual assistants, they are more and more common and are nowadays part of the daily life of ordinary people.

BRIEF SUMMARY

One exemplary embodiment of the disclosed subject matter is a method comprising: obtaining a vocal input from a user, wherein the vocal input is part of an interaction between the user and the voice-based interaction agent; determining an interaction context of the interaction between the user and the voice-based interaction agent; determining an output volume level of the voice-based interaction agent based on the interaction context; and providing to the user an output of the voice-based interaction agent, wherein the output comprises a voice-based output having a volume level of the output volume level.

Another exemplary embodiment of the disclosed subject matter is a non-transitory computer readable medium retaining program instructions, which program instructions when read by a processor, cause the processor to perform: determining an input volume level of a vocal input from a user, wherein the vocal input is part of an interaction between the user and a voice-based interaction agent; determining an output volume level of the voice-based interaction agent based on the input volume level, wherein the output volume level is determined in an inverse direction to the input volume level; and providing to the user an output of the voice-based interaction agent, wherein the output comprises a voice-based output having a volume level of the output volume level.

Yet another exemplary embodiment of the disclosed subject matter a non-transitory computer readable medium retaining program instructions, which program instructions when read by a processor, cause the processor to perform: obtaining a vocal input from a user, wherein the vocal input is part of an interaction between the user and the voice-based interaction agent; determining an interaction context of the interaction between the user and the voice-based interaction agent; determining an output volume level of the voice-based interaction agent based on the interaction context; and providing to the user an output of the voice-based interaction agent, wherein the output comprises a voice-based output having a volume level of the output volume level.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 1A-1E show a schematic illustration of an exemplary environment and architecture in which the disclosed subject matter may be utilized, in accordance with some exemplary embodiments of the disclosed subject matter;

DETAILED DESCRIPTION

Figure 2:
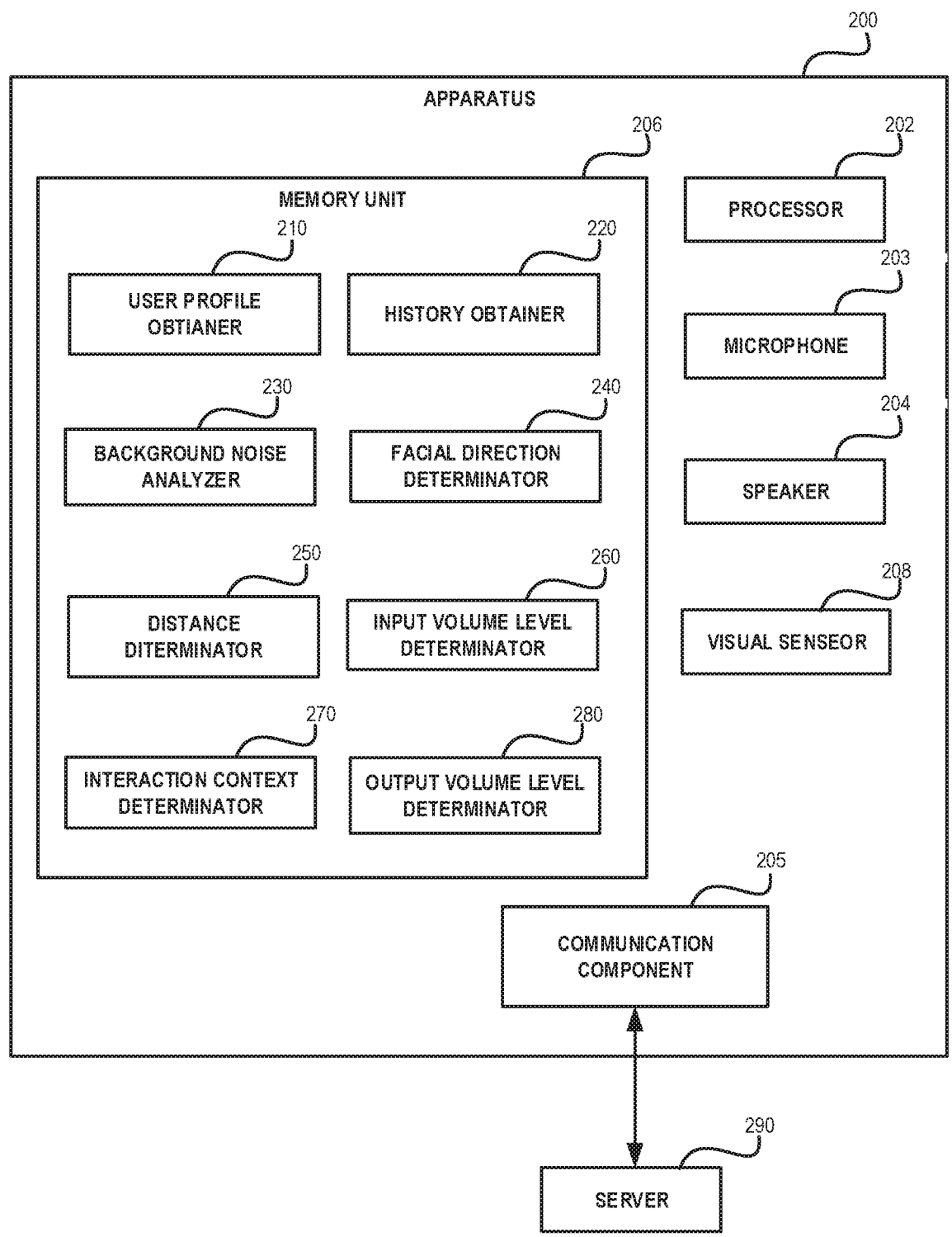
FIG. 2 shows an apparatus, in accordance with some exemplary embodiments of the disclosed subject matter.

One technical problem dealt with by the disclosed subject matter is to determine an appropriate output volume level for a voice-based interaction agent in a given interaction with one or more individuals, each having a potentially different state. In some exemplary embodiments, the output volume level may take into account various factors, such as factors relating to allowing the user to hear the output, the presence of bystanders, or the like. In some cases, it may be desired, for privacy reasons, to avoid having other people beside the user hear the provided output.

One technical solution is to determine the output volume level based on the interaction context of the user with the voice-based interaction agent, such as a timing factor at which the interaction occurs, spatial relationship between the user and the voice-based interaction agent, surrounding context, layout context, or the like.

In some exemplary embodiments, a vocal input is obtained from a user. The vocal input may be part of an interaction between the user and the voice-based interaction agent. The interaction context of the interaction between the user and the voice-based interaction agent may be determined. Based on the interaction context, an output volume level of the voice-based interaction agent may be determined. The user may be provided with an output of the voice-based interaction agent. The output may have a volume output level as was determined.

As an example, the interaction context may comprise information about a background noise. The origin of the background noise may be a motorcycle, a stadium, or the like. By using the disclosed subject matter, an output volume level that is above the input volume level may be determined.

As another example, the user may be whispering, such as in order to hide her interaction from nearby people. The input volume level may be 20 db, 22 db, or the like. The interaction context may comprise a surrounding context. The surrounding context may indicate that the parents of the user are with her at the same room. The interaction context may indicate that the user is requesting information regarding her boyfriend from the voice-based interaction agent. The voice-based interaction agent may be configured to determine a very low output volume level, a volume level that is below a whisper volume level. The low volume level may be 18 db, 16 db, or the like. Additionally or alternatively, the output volume level may be a muted volume level, and other output modalities may be utilized instead, such as responding via a WhatsApp message in text instead of using voice. In some exemplary embodiments, the surrounding context may be indicative to people that are near the user. In some exemplary embodiments, the user may be at a reception, at a concert, or the like. An output volume that is above a predetermined threshold may disturb people that are at the surrounding of the user. Additionally or alternatively, the surrounding context may indicate that the interaction is taking place at night, at the bedroom while the user's spouse is sleeping. An output volume level should be set accordingly as to not disturb the spouse.

In some exemplary embodiments, the interaction context may relate to a spatial relationship between the user and the voice-based interaction agent. For example, the facial direction of a user may impact the input volume level reaching the voice-based interaction agent as measured thereby. Even if the user speaks at the same speech volume level, different facial directions may cause the agent to measure different input volume levels. A facial direction that is away from the voice-based interaction agent may cause the input volume level to be lower than an input volume level that is measured by the voice-based interaction agent when the facial direction of the user is toward the voice-based interaction agent. While determining the output volume level, the input volume level may be utilized together with the facial direction and other spatial relationship factors, to estimate, directly or indirectly, the speech volume level of the user, which may be utilized in determining the output volume level. Similarly, the physical distance between the user and the agent may also affect the measured input volume level.

Yet another technical solution is to use history in order to determine an output volume level. Upon the end of an interaction, it may be possible to store the interaction context, the input volume level, the output volume, the feedback of the user, or the like. When a new interaction occurs, the history may be utilized to retrieve one or more historic records that may be of relevance to the interaction. For example, historic record comprising a matching interaction context and a matching input volume level may be obtained, and the feedback thereof may be utilized. During or after an interaction, a user may provide a feedback to the output volume level. The feedback may indicate that the volume was too low or too high. For example, the user may press the volume buttons or otherwise instruct a change of volume. The feedback may also be a verbal feedback such as "Alexa, I couldn't hear you", "OK Google, you are too loud", or the like. Additionally or alternatively, a lack of reply may indicate that the user did not hear the volume and may serve as a feedback of a too low volume level. For example, in case that the feedback was positive, the output volume level that is in the history may be used as the output volume level. Additionally or alternatively, in case that the feedback was negative, the historical output volume level may be corrected as to reflect the feedback of the user.

In some exemplary embodiments, the output volume level may be determined based on the layout context. The layout context may be indicative of the layout of the physical elements within the interaction space. Additionally or alternatively, the layout context may be indicative of an existence of audio-absorption items that are in the surrounding of the voice-based interaction agent or of the user. Such audio-absorption items may cause the input volume level as measured by the voice-based interaction agent to be below a predetermined threshold although the user's speech volume level may be above the predetermined threshold. Additionally or alternatively, the audio-absorption items may absorb some of the energy of the soundwaves emitted by the voice-based interaction agent before reaching the user, thereby justifying an increased output volume level.

Additionally or alternatively, the layout context may be indicative of an existence of audio reflecting items and indicative of the acoustics of the area in which the interaction is taking place. The output volume level may be determined taking into consideration the acoustics.

In some exemplary embodiments, the profile of the user may be utilized in determining the output volume level. The profile of the user may comprise at least one of a demographic attribute of the user; an interaction history of the user with the voice-based interaction agent; a medical profile of the user; or the like. As an example, some cultures use to speaking out loud (e.g. above 33 db, above 35 db, or the like) while other cultures are used to speaking more softly (e.g below 30 db, below 28 db or the like). People of different cultures may expect different output volume levels, in general, and in particular in response to their specific speech volume level.

One technical effect of utilizing the disclosed subject matter is to determine an output volume that will not disturb people that are at the vicinity of the user. The voice-based interaction agent may be configured to provide a vocal output having an output volume level such as the user may hear the vocal output clearly without disturbing her friends, family, coworkers, or the like that are at her vicinity.

Another technical effect of utilizing the disclosed subject matter is determining an effective output volume level as the user is walking in the vicinity of a voice-based interaction agent, changing her facial direction, or the like. Additionally or alternatively, there may be a plurality of voice-based interaction agents. The disclosed subject matter may be used in order to choose a voice-based interaction agent that will provide vocal output. The vocal output may have an output volume level that may be heard by the user as she is walking in the vicinity of the voice-based interaction agents. As an example, a person may be walking back and forth, interacting with voice-based interaction agents. As the person walks, her facial direction may change repeatedly, causing the input volume level, as measured, to repeatedly change. By using the disclosed subject matter, small changes in the input volume level (e.g 3 db, 4 db, or the like) may be ignored, allowing a constant output volume level, or constant effective output volume level so as to have the user perceive a same output volume level, as sensed by her ears.

Yet another technical effect of utilizing the disclosed subject matter is providing for an adaptive output volume level that is user-tailored, based on past interactions. Additionally or alternatively, the determination of the output volume level may improve over time, using user feedback.

As an example, a user may ask the voice-based interaction agent to read a text out-loud, such as an e-book, a news article, or the like. As the content is being read out loud, the user may be answering phone calls, making orange juice, doing home improvement construction, or the like. In case of an incoming call, the voice-based interaction agent may analyze the background noise level. Additionally or alternatively the voice-based interaction agent may obtain data regarding the incoming call. Based on the background noise level and on the data that was obtained regarding the call, the voice-based interaction agent may determine an output volume level for the output being provided thereby. As an example, the voice-based interaction agent may be configured to determine the importance of the call. In case that the background noise level combined with the audio output of the voice-based interaction agent may interfere with the call, the voice-based interaction agent may be configured to determine an output volume level that is a muted output volume level. In some exemplary embodiments, the muted output volume level may prevent the voice-based interaction agent from interfering with the user's experience in the phone call. Additionally or alternatively, the voice-based interaction agent may determine that the user does not wish to continue the call and may determine an output volume level that is a loud volume level (e.g 40 db) in order that the voice-based interaction agent vocal output would be heard by the other party of the call, who will wish to disconnect the call in view of the interference.

Additionally or alternatively, in the case that the user is making orange juice, the output volume level that may be determined above the corresponding background noise. In case that the voice-based interaction agent determined an output volume level that is too low for the user to hear, the user may press the volume up button. The interaction may be kept in history and upon the next time that the user will perform the same activity (e.g., make orange juice) while the voice-based interaction agent is reading a text thereto, the voice-based interaction agent may determine an appropriate output volume level.

As another example, many users may be using voice-based interaction agents while watching television (TV) in order to order dinner. While making their orders, users may want that the output volume level of the voice-based interaction agent will be above the volume level of the TV, allowing the users to clearly hear the output. The disclosed subject matter may be used in order to analyze the background noise and determining an appropriate output volume level based thereon. In some exemplary embodiments, the voice-based interaction agent may be configured to change the output volume level of the TV. In some exemplary embodiments, the voice-based interaction agent may be configured to set the output volume level of the TV below a predetermined threshold, allowing the users to order without being interfered by the TV.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIGS. 1A and 1B showing schematic illustrations of exemplary environments, in accordance with some exemplary embodiments of the disclosed subject matter.

The illustrated environment of FIG. 1A may comprise User 110a interacting with Voice-Based Interaction Agent 120. Voice-Based Interaction Agent 120 may be a virtual assistant, or chat-bot, such as ALEXA™, GOOGLE HOME™, SIRI™, or the like. Voice-Based Interaction Agent 120 may comprise a microphone capable to capture vocal input from User 110a. Voice-Based Interaction Agent 120 may further comprise a speaker capable of providing output to User 110a. In some exemplary embodiments, the speaker and microphone may be coupled or physically separated. In some exemplary embodiments, Voice-Based Interaction Agent 120 may utilize a processing power to analyze the input, determine output, generate vocal output, such as using text to speech methods, or the like. The processing power may be provided by a local processor, by an edge located in the vicinity of Voice-Based Interaction Agent 120, by a remote server, by a cloud-computing platform, or the like.

User 110a may provide vocal input to Voice-Based Interaction Agent 120. While providing the vocal input the facial direction of User 110a may be toward Voice-Based Interaction Agent 120, and located within Distance 115 from the microphone of Voice-Based Interaction Agent 120.

Voice-Based Interaction Agent 120 may determine an interaction context, representing the context of the interaction of the user with the Voice-Based Interaction Agent 120, such as a context of who is interacting with the agent, spatial relationship between the user and the agent (or components thereof), a context of the physical layout of the environment in which the interaction is performed, a surrounding context indicative of additional people that may be within a hearing range from the agent, and their state, or the like. Additionally or alternatively, the interaction context may comprise a demographic attribute of the user (e.g., 110a, 110b), history of the interactions of the user in the past, information regarding bystanders that may hear the interaction, timing of the interaction (e.g., the time of day, time of week, day of week, or the like), location information regarding the user and bystanders, information regarding audio-absorption items in the vicinity of Voice-Based Interaction Agent 120, or the like. Additionally or alternatively, the interaction context may comprise a surrounding context that may be indicative of an existence of one or more additional people in a surrounding of the user. The surrounding context may comprise information regarding bystanders, such as the existence of bystanders and their number, demographic information of the bystanders, social relationship between the bystanders and the user, information about the bystanders' activities, or the like. Additionally or alternatively, the interaction context may comprise a layout context that may be indicative of an existence of audio-absorption items in a surrounding of the voice-based interaction agent. The layout context may comprise a physical layout of the location where the agent is located, such as a blueprint of an office in which the agent is located, information about furniture located in the room where the agent is located, information regarding location of walls and material thereof, or the like.

In response to determining an interaction context, Voice-Based Interaction Agent 120 may determine an output volume level. Additionally or alternatively, Voice-Based Interaction Agent 120 may measure or obtain an input volume level of the vocal input, such as received by a microphone of Voice-Based Interaction Agent 120. The input volume level may be used in determining the output volume level.

Referring to the illustrated scenario shown in FIG. 1A, User 110a is located within a Distance 115 from Voice- Based Interaction Agent 120, such as within 1 meter. The facial direction of User 110a, as depicted in the figure, is towards Voice-Based Interaction Agent 120. Voice-Based Interaction Agent 120 may determine the facial direction of the user, as part of the interaction context. In some exemplary embodiments, the facial direction may be determined using sensors, cameras, or the like.

Referring to the illustrated scenario shown in FIG. 1B, User 110b, who is providing vocal input to Voice-Based Interaction Agent 120, is also located within the same distance, Distance 115 (1 meter). While providing the vocal input the facial direction of User 110b may be in an opposite direction from Voice-Based Interaction Agent 120.

In some exemplary embodiments, although both User 110a and User 110b speak at a same speech volume level, and although both are located within the same distance (Distance 115) from the microphone used by Voice-Based Interaction Agent 120, the input volume level as measured by the Voice-Based Interaction Agent 120 may differ. As can be appreciated, in view of the different facial direction with respect to the Voice-Based Interaction Agent 120, the measured input volume level of User 110a may be higher than that of User 110b. In some exemplary embodiments, and as the users are speaking at the same speech volume, and are located at the same distance, the output volume level of Voice-Based Interaction Agent 120 may be equal. This scenario exemplifies, that the interaction context may be useful in determining the output volume level of Voice-Based Interaction Agent 120. In some exemplary embodiments, the interaction context may indicate the spatial relationship between the user (110a, 110b) and Voice-Based Interaction Agent 120, and such information may be used to determine the output volume level desired for the user, such as a volume level that would reach the user's ears, a volume level that would be suitable to the current situation (e.g., the user shouting from afar, the user whispering from a close distance, or the like), or the like. In some exemplary embodiments, the interaction context may be analyzed together with the measured input volume level to reach the determination of the desired output volume level.

Additionally or alternatively, a history of interactions of the user may be consulted and utilized when determining the output volume level. In some exemplary embodiments, previous interactions having the same facial direction and the same input volume level may be obtained, and the determine output volume thereof may be used. In some exemplary embodiments, past feedback from the user may indicate desired output volume levels, and the desired volume levels may be used instead of volume levels that were indicated as undesired. Additionally or alternatively, similar past measurements, such as measurement within a range of ±10%, ±20%, or the like, may be obtained and consolidated in determining the output volume level.

In some exemplary embodiments, User 110a may be walking in a room. As User 110a is walking, her distance from Voice-Based Interaction Agent 120 may increase. As an example, when reaching a certain location, User 110a' is located in Distance 116 (2 meters) from Voice-Based Interaction Agent 120, which is larger than Distance 115. As a result, the volume input level of her voice, as measured by Voice-Based Interaction Agent 120, may decrease, and may be have a low volume level such as a whisper. For example, the measured volume may be below a predetermined whisper threshold, such as below about 20 db, below about 22 db, below about 25 db, or the like. However, the measured input volume level may be below the predetermined whisper threshold not because User 110a' is whispering, but due to the increased distance. In some exemplary embodiments, Voice-Based Interaction Agent 120 may determine an output volume level that takes into account the estimated speech volume of User 110a'. For example, in view of Distance 116 and the measured input volume level, an output volume level above the predetermined whisper threshold may be produced. The output volume level may be determined to be at a speaking range, such as between about 28 db, about 30 db, about 32 db, or the like, and between about 30 db, about 32 db, about 34 db, or the like. In some exemplary embodiments, the output volume level may be determined based on Distance 116, so as to enable User 110a' to hear the provided audio output.

Additionally or alternatively, User 110b may be whispering. As a result, the input volume level may be below a predetermined threshold, such as below 22 db, below 20 db, or the like. Voice-Based Interaction Agent 120 may be configured to differentiate the current scenario from the scenario in which User 110b is far away from Voice-Based Interaction Agent 120 or facing a different direction, and determine an output volume level that is suitable to the fact that User 110b is indeed whispering. For example, instead of determining an output volume level suitable for a regular speaking voice, e.g., about 30 db, about 32 db, or the like, the determined output volume level may be similar to the input volume level, and may match a whispering voice, such as about 20 db, about 22 db, or the like.

In some exemplary embodiments, User 110b may enter her bedroom late at night and initiate a voice interaction with Voice-Based Interaction Agent 120 without noticing that her spouse (not shown) is asleep. Voice-Based Interaction Agent 120 may determine an interaction context of the interaction. The interaction context may be an interaction occurring in a bedroom at night. The interaction context may further comprise information about a bystander—the sleeping spouse. Based on the interaction context, Voice-Based Interaction Agent 120 may set the output volume level below a predetermined threshold in order to avoid waking up, or otherwise disturbing the spouse.

Referring now to FIG. 1C showing a schematic illustration of an exemplary environment, in accordance with some exemplary embodiments of the disclosed subject matter.

Voice-Based Interaction Agent 120 may obtain an interaction context. The interaction context may comprise a layout context. The layout context may comprise indications regarding the existence of audio absorbent items in the area where the interaction is taking place. The layout context may indicate the existence of audio absorbent items that may absorb the audio outputted by Voice-Based Interaction Agent 120, or the speaking voice of User 110c before reaching the microphone of Voice-Based Interaction Agent 120. As illustrated in FIG. 1C, the area where the interaction takes place comprises Wall 130 that may potentially be an audio barrier between User 110c and between Voice-Based Interaction Agent 120. Voice-Based Interaction Agent 120 may be configured to determine an output volume level that takes into account the existence of Wall 130. For example, if the input volume level is below a predetermined whisper threshold due to Wall 130 absorbing the sound of the user's speech, the output volume level may be determined accordingly to be higher than the input volume level, and such that the expected volume level that would reach the user's ears may be within a desired volume range.

In some exemplary embodiments, the layout context may comprise blueprints of the room, indicating locations of walls, of furniture, or the like. In some exemplary embodiments, the layout context may indicate the material of the items, such as wooden table, parquet floor, or the like. Additionally or alternatively, the layout context may indicate the existence of audio reflecting items, and the acoustics of the area in which the interaction is taking place. Voice-Based Interaction Agent 120 may take into account the layout context when determining the output volume level.

Referring now to FIG. 1D showing a schematic illustration of an exemplary environment, in accordance with some exemplary embodiments of the disclosed subject matter.

The illustrated environment of FIG. 1D may comprise User 110d, Microphone 122 and Speaker 124. Microphone 122 and Speaker 124 may be operatively coupled in order to embody the functionality of a voice-based interaction agent such as Voice-Based Interaction Agent 120 of FIG. 1A, FIG. 1B, FIG. 1C, or the like. Management Entity 126 may be configured to perform said voice-based interaction agent functionality, and may be operatively coupled to Microphone 122, Speaker 124, or the like.

In some exemplary embodiments, Management Entity 126 may be a physical device connected with Microphone 122 and/or with Speaker 124 via Bluetooth™, WiFi connection, or the like, and located substantially in the same location as Microphone 122 and/or Speaker 124. Additionally or alternatively, Management Entity 126 may be a software running on the mobile device of User 110d, on a remote cloud server, or the like, and connected to Microphone 122 and/or Speaker 124 via a computerized network, such as the Internet. It is noted, that in such embodiments where the voice-based interaction agent is composed of physically separated components, the physical location of the agent may be considered to be the physical location of Microphone 122, of Speaker 124, of Management Entity 126, or the like.

In some exemplary embodiments, Management Entity 126 may be configured to obtain an interaction context. The interaction context may comprise a spatial relationship between User 110d and Microphone 122, such as Distance 115, a relative facial direction between User 110d and Microphone 122, or the like. Additionally or alternatively, the interaction context may comprise a spatial relationship between User 110d and Speaker 124, such as Distance 116, relative facial direction therebetween, or the like. Based on the interaction context, Management Entity 126 may be configured to determine an output volume level. In some exemplary embodiments, because Distance 115 is shorter than Distance 116, the determined output volume level may be above the input volume level.

In some exemplary embodiments, Management Entity 126 may use a formula in order to calculate the output volume level. The formula may be taken into account different portions of the interaction context, determine an output volume based on each different portion, and calculate a weighted average of the different output volumes, based on the weights given to the different portions. Referring now again to the illustrated embodiment of FIG. 1D, a first portion of the interaction context may relate to the spatial relationship between User 110d and Microphone 122, while a second portion of the interaction context may relate to the spatial relationship between User 110d and Speaker 124. Management Entity 126 may compute a separate output volume based on each portion and determine a weighted average of the output volumes which is used as the output volume level. In some exemplary embodiments, Management Entity 126 may be configured to determine different weights to different portions based on the interaction context, such as lowering a weight of the first portion due to Distance 115 being below a predetermined threshold and increasing a weight of the second portion.

Referring now to FIG. 1E showing a schematic illustration of an exemplary environment, in accordance with some exemplary embodiments of the disclosed subject matter.

The illustrated environment of FIG. 1E may comprise User 110e, Management Entity 126 and a plurality of Voice-Based Interaction Agents (120, 120'). Management Entity 126 may be embedded in any of the Voice-Based Interaction Agents 120, 120', in a remote cloud server, in a standalone device, or the like. Management Entity 126 may utilize the plurality of Voice-Based Interaction Agents 120, 120'. In some exemplary embodiments, the interaction context may comprise a first interaction context between User 110e and Voice-Based Interaction Agent 120, and a second interaction context between User 110e and Voice-Based Interaction Agent 120'. Each interaction context may comprise, for example, indications relating to the spatial relationship between User 110e and the respective voice-based interaction agent, such as distance, relative facial direction, or the like. Based on the different interactions contexts, Management Entity 126 may select from which voice-based interaction agent input is obtained, using voice-based interaction agent vocal output is provided, and what output volume level is to be used.

For example, User 110e may be facing towards Agent 120 and away from Agent 120'. User 110e may be closer to Agent 120' than to Agent 120. In such a scenario, the input quality of the microphone of Agent 120 may be estimated to be higher than that of Agent 120'. Management Entity 126 may select Agent 120 as to device from which audio is obtained. However, due to the distance of User 110e, and the fact that facial direction is irrelevant for the user's ability to hear vocal output, the Speaker of Agent 120' may be selected to provide the vocal output. It is noted that in such a scenario, the input volume level, taken into consideration with the spatial relationship of User 110e towards Agent 120, may be used to estimate speech volume level of User 110e when she provided her input. The output volume level may take into account the estimated speech level, as well as the spatial relationship between User 110e and Agent 120'. As a result, if normal speech volume is estimated (e.g., about 30 db), a normal output hearing volume may be desired (e.g., volume of about 30 db as heard by User 110e), and the spatial relationship between Agent 120' and User 110e may be taken into account to determine the output volume level that is estimated to provide the desired normal hearing volume level.

Referring now to FIG. 2, showing an apparatus in accordance with some exemplary embodiments of the disclosed subject matter.

In some exemplary embodiments, Apparatus 200 may be configured to provide a voice-based interaction agent, capable of interacting with a human user using vocal commands.

In some exemplary embodiments, Apparatus 200 may comprise a Processor 202. Processor 202 may be a Central Processing Unit (CPU), a microprocessor, an electronic circuit, an Integrated Circuit (IC) or the like. Additionally or alternatively, Apparatus 200 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). Processor 202 may be utilized to perform computations required by Apparatus 200 or any of it subcomponents.

Apparatus 200 may comprise Microphone 203. Microphone 203 may be used as an input device in order to obtain the vocal input of the user, such as vocal input to the voice-based interaction agent. In some exemplary embodiments, Microphone 203 may be an integral part of Apparatus 200. Additionally or alternatively, Microphone 203 may be external to Apparatus 200 and physically separated therefrom. Microphone 203 may be connected to Apparatus 200 using a wired connection, using a wireless connection, or the like. In some exemplary embodiments, the wireless connection may be, for example, WiFi, Bluetooth™, or the like. In some exemplary embodiments, Apparatus 200 and Microphone 203 may communicate over the connection using a predetermined protocol, such as Hyper Text Transfer Protocol (HTTP), Transfer Communication Protocol (TCP), Zigbee, or the like. Microphone 203 may communicate with Apparatus 200 via Communication Component 205.

In some exemplary embodiments, Apparatus 200 may be operatively coupled to a plurality of microphones, such as Microphone 203. In some exemplary embodiments, Apparatus 200 may be configured to select a microphone to obtain the vocal input of the user. The microphone may be selected based on the input volume level sensed thereby, based on the location of the user, or the like. In some exemplary embodiments, Apparatus 200 may change its selection of microphone over time. In some exemplary embodiments, the selected microphone may change in response to movement of the user, constantly selecting a closet microphone (or set of microphones) to the user. Additionally or alternatively, the selected microphone may change in view of a quality of input deterioration below a predetermined quality threshold. Additionally or alternatively, the selected microphone may change in view of a malfunction of the selected microphone, rendering it incapable of providing input. Additionally or alternatively, a set of microphones may be used and their input may be aggregated together to improve overall quality of input obtained by the voice-based interaction agent.

In some exemplary embodiments, Apparatus 200 may comprise Speaker 204. Speaker 204 may be used as an output device in order to provide the vocal output of the voice-based interaction agent.

In some exemplary embodiments, Speaker 204 may be an integral part of Apparatus 200. Additionally or alternatively, Speaker 204 may be external to Apparatus 200 and physically separated therefrom. Speaker 204 may be connected to Apparatus 200 using a wired connection, using a wireless connection, or the like. In some exemplary embodiments, the wireless connection may be, for example, WiFi, Bluetooth™, or the like. In some exemplary embodiments, Apparatus 200 and Speaker 204 may communicate over the connection using a predetermined protocol, such as Hyper Text Transfer Protocol (HTTP), Transfer Communication Protocol (TCP), Zigbee, or the like. Speaker 204 may communicate with Apparatus 200 via Communication Component 205.

In some exemplary embodiments, Apparatus 200 may be operatively coupled to a plurality of speakers, such as Speaker 204. In some exemplary embodiments, Apparatus 200 may be configured to select a speaker to provide the vocal output of the voice-based interaction agent. The speaker may be selected based on the input volume level sensed by one or more microphones, based on the location of the user, or the like. In some exemplary embodiments, Apparatus 200 may change its selection of speaker over time. In some exemplary embodiments, the selected speaker may change in response to movement of the user, constantly selecting a closet speaker (or a set of speakers) to the user. Additionally or alternatively, the selected speaker may change in view of a quality of output deterioration below a predetermined quality threshold. Additionally or alternatively, the selected speaker may change in view of a malfunction of the selected speaker, rendering it incapable of providing output.

In some exemplary embodiments, Apparatus 200 may comprise a Communication Component 205. Apparatus 200 may utilize Communication Component 205 as an interface to transmit and/or receive information between Apparatus 200 and external devices, such as a Server 290, external I/O device (e.g., external Speaker 204, external Microphone 203), or the like. In some exemplary embodiments, Apparatus 200 may receive from Server 290 information such as a profile of the user, history of the interactions of the user, a map of the place in which Apparatus 200 is located, or the like. Additionally or alternatively, Apparatus 200 may transmit to Server 290 information such as information regarding a current interaction of the user, to be aggregated and retained as part of the history of the interactions of the user, information gleaned from the user's activities or input, or the like.

Apparatus 200 may comprise Visual Sensor 208, such as a camera. Visual Sensor 208 may be utilized by Facial Direction Determinator 240, by Distance Determinator 250, or the like. In some exemplary embodiments, Visual Sensor 208 may be utilized in order to determine the layout context, the interaction context, the surrounding context, or the like. Visual images may be obtained from Visual Sensor 208 and analyzed in order to determine existence of audio-absorption items in the surrounding of the voice-based interaction agent and/or in the surrounding of the user. Additionally or alternatively, Visual Images may be obtained and analyzed in order to determine the existence of one or more additional people in a surrounding of the user.

It is noted that Apparatus 200 may comprise additional sensors that may be used in order to determine different contexts, such as but not limited to proximity sensor, volume detector, accelerometer, thermostat, barometer, or the like.

Apparatus 200 may comprise Memory Unit 206. Memory Unit 206 may be a hard disk drive, a Flash disk, a Random Access Memory (RAM), a memory chip, or the like. In some exemplary embodiments, Memory Unit 206 may retain program code operative to cause Processor 202 to perform acts associated with any of the subcomponents of Apparatus 200. In some exemplary embodiments, Memory Unit 206 may be used to retain user profiles of users, history records of past interactions, user preferences, or the like.

Memory Unit 206 may retain a User Profile Obtainer 210. User Profile Obtainer 210 may be configured to obtain a profile of a user. A profile of the user may comprise a demographic attribute of the user, an interaction history of the user, a medical profile of the user, a combination thereof, or the like. In some exemplary embodiments, User Profile Obtainer 210 may obtain a profile of the user from a data storage, such as retained locally in Memory Unit 206, retained remotely, such as in Server 290, or the like.

In some exemplary embodiments, the profile of the user may be used by Output Level Determinator 280. As an example, the profile of the user may comprise a medical profile indicating that the user has a hearing impairment. In such a case, a coefficient larger than one (1) may be used in order to increase the output volume level. The coefficient may be associated with the hearing impairment of the user and the level of disability from which she suffers. As another example, the profile of the user may indicate that the user is indifferent to the virtual assistant interrupting music that she hears. Output Level Determinator 280 may be configured to determine an output volume level that would interfere with the listening experience of the user. If, in an opposite case, the user profile indicates that the user is concerned with her listening experience, the output volume level may be determined accordingly or an alternative output manner not involving audio output may be used. Yet another example, if the user profile is of an aged individual, the determined output volume may be increased. Additionally or alternatively, if the user profile indicates the user is a female, the determined output volume level may be lower than in the case of a male. Additionally or alternatively, the demographic information may indicate cultural preferences of the user regarding vocal interactions, such as when the user speaks in a high volume level, she may prefer hearing a correspondingly high volume output or, in other cultures, it may be preferred that the corresponding output volume level would be low.

Memory Unit 206 may retain a History Obtainer 220. History Obtainer 220 may be configured to obtain a history of interactions between the user and Apparatus 200. Additionally or alternatively, the history may include interactions with other apparatus implementing a voice-based interaction agent. In some exemplary embodiments, the history may include, for each interaction, an input voice volume level and a corresponding output voice volume level. The history may include an interaction context of the interaction. In some exemplary embodiments, the history may include a location stamp for each interaction, a surrounding context of each interaction, a timestamp for each interaction, a layout context of each interaction, a distance of the user from the voice-based interaction agent for each interaction, a facial direction of the user with respect to the voice-based interaction agent for each interaction, or the like. Additionally or alternatively, the history may include a user response to the vocal output, such as whether the user heard the output or not, whether the user instructed a volume change (e.g, volume up or volume down instructions), or the like. In some exemplary embodiments, History Obtainer 220 may obtain history records of the user from a data storage, such as retained locally in Memory Unit 206, retained remotely, such as in Server 290, or the like. In some exemplary embodiments, the history records may be provided in any format, such as but not limited to a text format, a JavaScript Object Notation (JSON) format, an audio format, a combination thereof, or the like.

In some exemplary embodiments, after an input volume level of the vocal input is determined, History Obtainer 220 may search the history to obtain historic interactions of the user. In some exemplary embodiments, each historic interaction of the user may comprise a historic volume level. The historic volume level may be the input volume level, the estimated speech volume level in view of the interaction context, or the like. Additionally or alternatively, the historic interaction may comprise an interaction context. The input volume level of the vocal input may be compared with a statistical measurement of the historic volume levels. In some exemplary embodiments, the statistical representation may be an average of the historic volume levels, a median of the historic volume levels, or the like. The comparison may be performed with respect to interactions having the same or a similar interaction context, such as at the same distance, having the same facial direction, in a similar layout context, having similar surrounding context, or the like. Additionally or alternatively, the comparison may be performed using historic interactions having different interaction contexts, while estimating for each historic interaction context, an estimated speech volume. In some exemplary embodiments, based on the comparison, the relative volume level of the vocal input may be determined. The relative volume level may be, for example, a relative whisper, a relative normal speech, a relative shout. The relative volume may be relative to the user's own volume levels. As a result, the same volume level may be considered as a relative whisper for one user, and a relative shout for another. As an example, a volume level that is between the range of about 0%-30% of the average input volume level may be considered as a relative whisper, a volume level that is in the range of about 30%-70% of the average input volume level may be considered as a relative normal speech, and a volume level that is in the range of about 70%-100% of the average input volume level may be considered as a relative shout. The above ranges are exemplary only, and other ranges may be applied. Additionally or alternatively, the ratio between the current input volume level and the historic average input volume level may be computed and used as a multiplier to a determined output volume level. For example, given the interaction context, an output volume level of 35 db may be determined. However, as the ratio between the current input volume level of the vocal input and the historic average input volume level may be 1.1 (e.g., 33 db instead of a historic average of 30 db), the actual provided output may be provided with the same ratio, e.g. 35 db·1.1=38.5 db.

Additionally or alternatively, a plurality of matching records may be retrieved and a determination of the output level may be made based thereon, such as by making an adjusted calculation, potentially taking into consideration historic feedback received from the user.

In some exemplary embodiments, a historic record may comprise an input volume level, an interaction context, an output volume level, a historic feedback, or the like. In determining the output volume level for a current interaction, historic records having similar interaction context as the current interaction, may be obtained and utilized. The historic feedback in such historic records may indicate whether the historic output volume level that was provided was satisfactory. The feedback may indicate whether a higher output volume may be desired, such as in case of historic feedback indicating the user had ignored the output or asked to receive it again as she may not have heard it. Additionally or alternatively, the feedback may indicate whether a lower output volume level may be desired, such as in case of historic feedback indicating the output volume was too high, such as a verbal feedback "Hey Siri, please keep it down", or the like. Additionally or alternatively, the feedback may indicate whether the output level was satisfactory, such as in case the user responded to the output and did not request and adjustment. In some exemplary embodiments, the user may provide for explicit positive feedback such as explicitly indicating that the volume level is acceptable (e.g., spontaneously or in response to a question of the virtual agent). In some exemplary embodiments, the historic records may be utilized to implement an adaptive output volume level determination that is based on the specific user's preferences.

Memory Unit 206 may retain Background Noise Analyzer 230. Apparatus 200 may use Background Noise Analyzer 230 in order to determine the noise level in the surroundings of the user. Additionally or alternatively, Background Noise Analyzer 230 may be used in order to determine the background noise level in the surroundings of Microphone 203, in the surroundings of Speaker 204, or the like. In some exemplary embodiments, the background noise level may be utilized in determining the output volume level. As an example, the set of parameters may include an interaction context and an input volume level. It may be night and the user may be home. A background noise level that is below a predetermined threshold may yield a quite environment. Hence, the output volume level may be equal to the input volume level. Additionally or alternatively, the background noise level may be above a predetermined threshold yielding a noisy environment. In such case, the output volume level may be larger than the input volume level.

In some exemplary embodiments, Apparatus 200 may use Background Noise Analyzer 230 in order to analyze background noises and determine their type, volume level, origin, or the like. The output volume level may be determined while taking into account the background noise. As an example, Background Noise Analyzer 230 may determine that the background noise corresponds to noise that may be a result of nearby constructions, such as a repetitive sound that is consistent with a use of a machine. In such a case, the output volume level may be determined so as to overcome the background noise, be above the background noise, or the like, so as to allow the user to hear the output in the noisy environment. Additionally or alternatively, Background Noise Analyzer 230 may determine that the noise is caused by people talking and singing at the vicinity of the user. Such may be the case when the user is at a social event, attending a multi-participant meeting, or the like. In such case, the output volume level may be determined so as not to interfere with the event, meeting or the like. The output volume level may be determined so as to allow the user to hear the output if the user is nearby, but not to be heard by other participants, or otherwise interfere with their experience In some exemplary embodiments, Background Noise Analyzer 230 may be utilized to separate the user's speech from background noise. After separating the speech input from the input obtained by Microphone 203, the input volume level may be determined, such as by Input Volume Level Determinator 260, and used. By separating the speech from the background noise, the input volume level that is taken into consideration when determining the output volume level is that of the user's speech, and is not affected by a noisy environment.

Memory Unit 206 may retain Facial Direction Determinator 240. Facial Direction Determinator may be configured to determine the direction of the face of the user with respect to Microphone 203. In some exemplary embodiments, the facial direction of a user may impact the input volume level as the input volume level may be measured by the voice-based interaction agent. A facial direction that is away from the voice-based interaction agent may cause the input volume level to be lower than an input volume level as it may be measured by the voice-based interaction agent when the facial direction of the user is toward the voice-based interaction agent, even if in both cases, the user speaks at a same speech level. In some exemplary embodiments, the determined facial direction may be utilized when determining the output volume level.

Memory Unit 206 may retain Distance Determinator 250. Distance Determinator 250 may be configured to determine the distance of the user from Apparatus 200, Microphone 203, Speaker 204, or the like. Distance Determinator 250 may determine the distance using measurements from sensors that are at the surrounding of Apparatus 200, or the like. In some exemplary embodiments, camera may be used to identify the user and measure her distance. Additionally or alternatively, other sensors may be utilized. Additionally or alternatively, layout information about the surroundings of Apparatus 200 may be utilized. In some exemplary embodiments, the volume output level may be a function of the distance of the user from Speaker 204. Additionally or alternatively, the output volume level may take into account the input volume level together with the distance of the user from Microphone 203. In some exemplary embodiments, as the distance of the user from Speaker 204 increases the output volume level may increase as well.

Memory Unit 206 may retain Input Volume Level Determinator 260. The Input Volume Level Determinator 260 may be configured to determine the volume level of the input, as measured in Microphone 203. In case that there are a plurality of microphones, Volume Level Determinator 260 may determine a volume as measured in some of the microphones. Additionally or alternatively, the volume level may be determined with respect to the user's voice. In some exemplary embodiments, the input volume level of the user's voice may be determined after separating the user's voice from background noise, such as using Background Noise Analyzer 230.

Memory Unit 206 may retain Interaction Context Determinator 270. Interaction Context Determinator 270 may be configured to determine the interaction context of an interaction. The interaction context may comprise a profile of the user, such as was obtained by User Profile Obtainer 210; the spatial relationship between the user and Apparatus 200 (e.g., facial direction determined by Facial Direction Determinator 240, distance determined by Distance Determinator 250, or the like); a layout context; a surrounding context; characteristics of the background noise (e.g., determined by Background Noise Analyzer 230); or the like.

Memory Unit 206 may retain Output Volume Level Determinator 280. Output Volume Level Determinator 280 may be configured to determine the volume level of the vocal output of the voice-based interaction agent. The input of Output Volume Level Determinator 280 may comprise an interaction context (e.g., determined by Context Determinator 270), interactions history (e.g., obtained by History Obtainer 220), the input volume level (e.g., determined by Input Volume Level Determinator 260), the preferences of the user (e.g., user-provided preferences regarding volume output), or the like. In some exemplary embodiments, Output Volume Determinator 280 may be configured to determine the output volume level based on the layout context, such as while taking into consideration obstacles in between the user and Speaker 204 or Microphone 203, expected sound-absorption of the items, or the like.

In some exemplary embodiments, Apparatus 200 may communicate with Server 290. Server 290 may be utilized as a data storage, such as retaining interactions history, user preferences, or the like. Additionally or alternatively, some of the computations described with relation to Apparatus 200 may be performed by Server 290 or other computational platforms.

Figure 3:
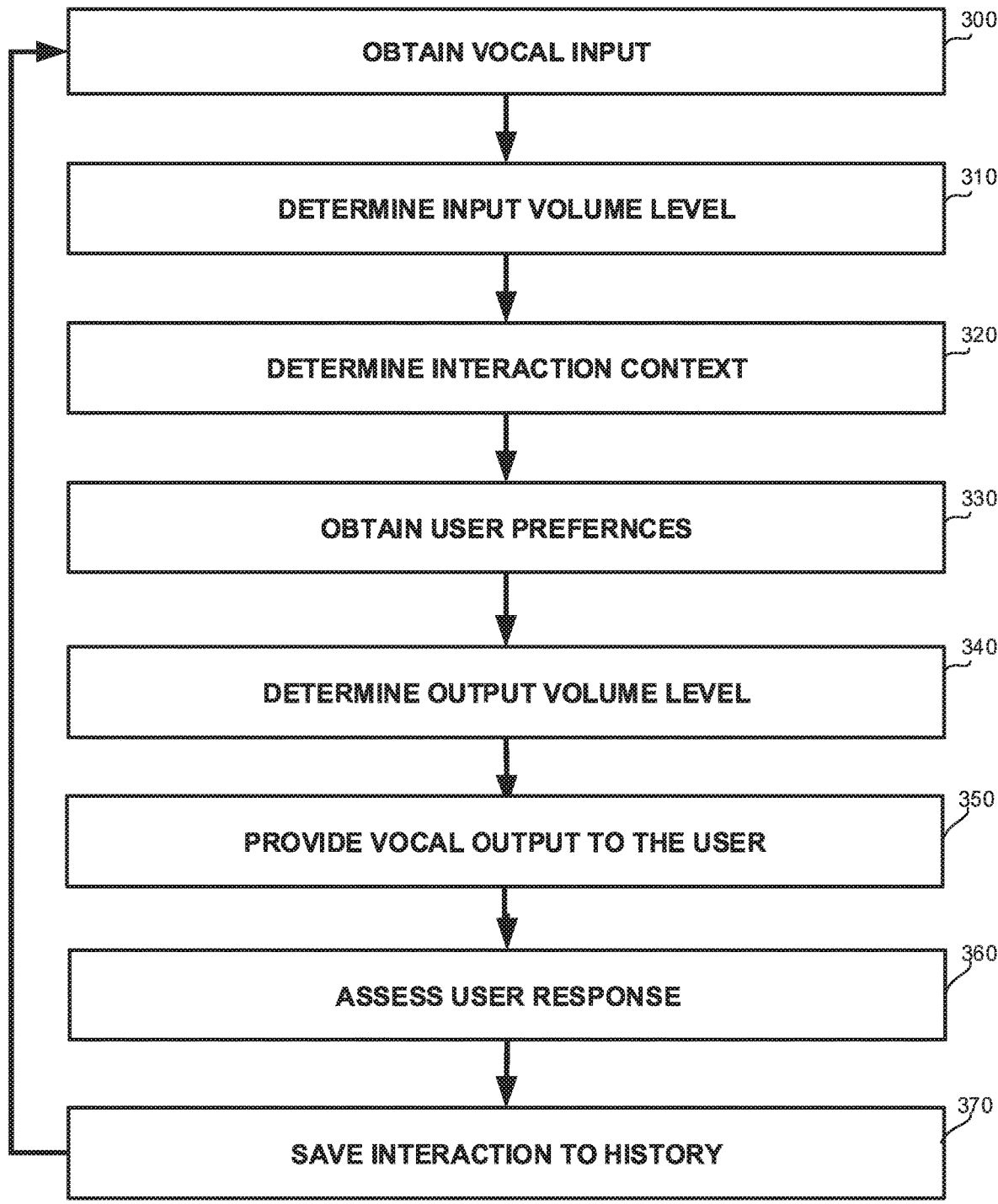
FIG. 3 shows a flowchart diagram of a method, in accordance with some exemplary embodiments of the disclosed subject matter.

Referring now to FIG. 3, showing a flowchart in accordance with some exemplary embodiments of the disclosed subject matter.

On Step 300, a vocal input is obtained. The vocal input may be obtained by a microphone that is operatively coupled with voice-based interaction agent such as Voice-Based Interaction Agent 120 of FIG. 1A. The vocal input may comprise a vocal prefix indicating that the vocal input is addressed to the voice-based interaction agent. The vocal prefix may be "Hey Siri", "Alexa", "Ok Google", or the like.

On Step 310, an input volume level is determined. The input volume level may be determined by using Sound Pressure Level (SPL), based on the measured volume level, based on analyzing the captured soundwave, or the like. In some exemplary embodiments, it may be desired to isolate the user voice from background noises and other noises in the surroundings. In some exemplary embodiments, the input volume level may comprise a volume level of the user as it may be measured at the voice-based interaction agent, a background noise level at the surroundings of the user, or the like.

In some exemplary embodiments, the noise level at the surrounding of the user may assist in determining information regarding the interaction context, for example whether the user is interacting in a noisy environment or in a quite environment. As an example, it may be determined that the interaction context is a quite interaction context. It may also be determined that the user's input volume level is below a predetermined threshold such as indicative for a quite input volume level the user. As a result by using the disclosed subject matter it may be determined that the user's input volume level is quite not because the user is far away but rather because the user is speaking below the predetermined volume level.

In some exemplary embodiments, the background noise level that is determined may comprise a background noise level at the surroundings of the microphone of the voice-based interaction agent (e.g., 122 of FIG. 1D), the background noise level at the surroundings of the speaker of the voice-based interaction agent.

On Step 320, an interaction context is determined. The interaction context may comprise a profile of the user. The profile of the user may comprise data such as but not limited to demographic attributes about the user such as age, gender, culture, geolocation, or the like. Additionally or alternatively, the profile of the user may comprise a medical profile of the user, such as indications of hearing impairments and other medical conditions relevant for the interaction. In some exemplary embodiments, based on the identity of the user, her interaction history may be obtained and utilized in determining the interaction context. As an example, using the interaction history, a relative volume level of the vocal input may be determined.

Additionally or alternatively, the interaction context may comprise a surrounding context that may be indicative of an existence of one or more additional people in a surrounding of the user. In some exemplary embodiments, the surrounding context may indicate the relationship between the user and the bystanders (e.g., spouse, mother, friend, colleague, or the like). Additionally or alternatively, the surrounding context may indicate the activity or state of the bystanders such as sleeping, participating in a conversation, watching a movie, or the like. As an example, the output volume level when a spouse is sleeping may be lower than when a colleague is sleeping. As yet another example, a teenager may interact with the voice-based interaction agent in his room. If his mother steps in, the surrounding context may change accordingly, and cause a reduction in the output volume level regarding intimate information.

Additionally or alternatively, the interaction context may comprise a layout context that may be indicative of an existence of audio-absorption items in a surrounding of the voice-based interaction agent. In some exemplary embodiments, the layout context may be indicative of an existence of audio-absorption items in a surrounding of the user.

Additionally or alternatively, the interaction context may comprise a spatial relationship measurement between the user and the voice-based interaction agent or components thereof. In some exemplary embodiments, the interaction context may comprise the facial direction of the user with respect to Microphone 203 of FIG. 2. Additionally or alternatively, the interaction may comprise the distance of the user from Microphone 203. Additionally or alternatively, the interaction context may comprise the distance of the user from Speaker 204.

Additionally or alternatively, the interaction context may comprise the volume level of the background noise. Additionally or alternatively, the interaction context may comprise characteristics of the background noise such as origin, type, or the like.

On Step 330, preferences of the user may be obtained. The preferences of the user may comprise one or more desired output volume levels. The preferences may be obtained from a local storage, from a remote cloud server, from the user's mobile device, or the like. The desired output level may be relative, absolute, or associated with an audio profile. An absolute desired volume level may be that the user prefers that the output volume level will be a fixed volume level. A relative desired output level may be that the user prefers that the output volume level will be 10% more than the input volume level. An audio profile may refer to preferences of users while sleeping (e.g. only alarms are permitted), while working (e.g. only calls from co-workers are permitted), while doing sport (e.g. only music is permitted), or the like. In some exemplary embodiments, the user preferences may relate to input volume levels, to interaction contexts, or the like. In some exemplary embodiments, the user may define a desired output volume level for different input volume ranges, different interactions contexts, combination thereof, or the like.

On Step 340, the output volume level may be determined. The output volume level may be determined based on the input volume level, based on the user's preferences, based on the interaction context, or the like. In some exemplary embodiments, the determined output volume level may be a mute level, indicating that no audio output should be provided. Additionally or alternatively, other output modalities may be utilized together with or instead of audio modality, such as text-based output, graphical output, haptic output, or the like. In some exemplary embodiments, Output Volume Level Determinator of FIG. 2 may be utilized to determine the output volume level based on the interaction context.

On Step 350, output may be provided to the user. The output may comprise a voice-based output having a volume level of the output volume level as was determined on Step 340.

On Step 360, the user response may be assessed. In some exemplary embodiments, having no response may also be assessed as it may indicate that the user did not hear the output. Additionally or alternatively, the user may provide a vocal input such as "Alexa, that was too loud", "Hey Siri, keep it down", or the like. Additionally or alternatively, the user response may comprise the user pressing volume buttons, widgets or controllers, shortly after the output is provided (e.g., within a predetermined timeframe, such as 5 seconds, 10 second, 20 seconds, one minute, or the like).

On Step 370, the interaction may be saved to history. The history may be retained for future use. The interaction may be saved on a local storage medium, on a remote cloud server, on a combinations thereof, or the like. The interaction history that is stored may comprise the vocal input of the user, the vocal output of the voice-based interaction agent, the interaction context, the user preferences, the input volume level, the output volume level, or the like. In some exemplary embodiments, the response of the user, as determined in Step 360, may be retained as part of the interaction history, so as to indicate whether the user was satisfied with the output volume level. In some exemplary embodiments, the historic interaction may be utilized in determining an output volume level. In some exemplary embodiments, the interaction history may be used to modify and adapt the weights given to different factors utilized in computing the output volume level. The history may be obtained by other voice-based interaction agents that are different then the voice-based interaction agent that the user with which the interaction occurred.

In some exemplary embodiments, steps 300-370 may be repeated for each vocal interaction of the user with the voice-based interaction agent.

Figure 4:
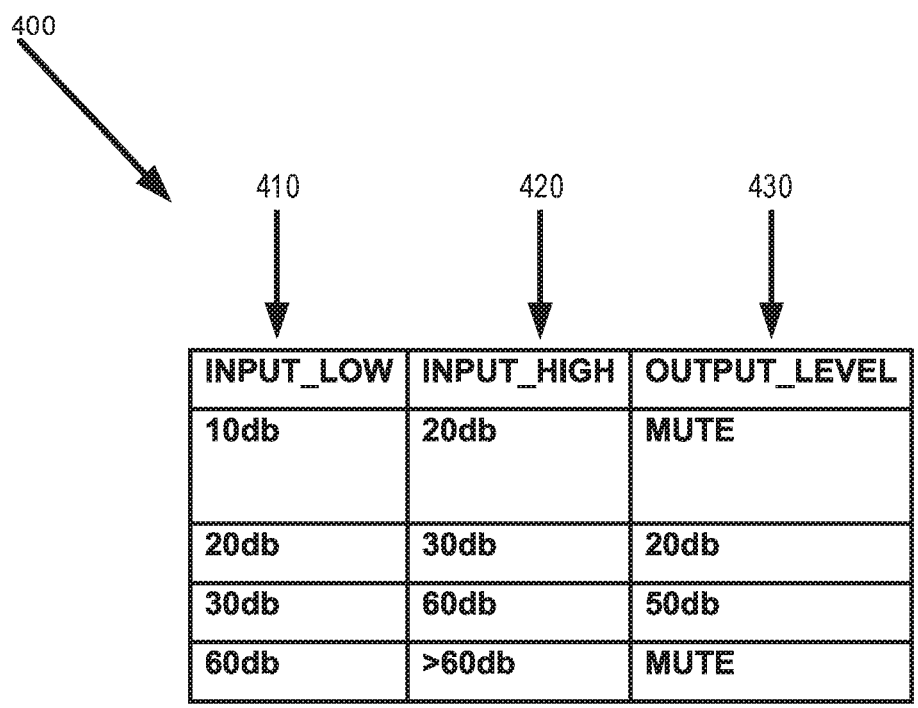
FIG. 4 shows a table of a method, in accordance with some exemplary embodiments of the disclosed subject matter.

Referring now to FIG. 4 showing a table, in accordance with some exemplary embodiments of the disclosed subject matter.

Table 400 suggests a set of possible output volume levels at different states.

Column 410 shows lower bounds to input volume ranges, while Column 420, shows upper bounds to the input volume ranges. Column 430 shows possible output volume levels, each of which corresponding to a different input volume level range.

Table 400 may suggest that an input volume level that is between 10 db and 20 db may yield an output volume level of a muted volume level. Table 400 further suggests that an input volume level that is between 20 db to 30 db may yield an output volume level of 20 db. Table 400 may further suggest that an input volume level that is between 30 db and 60 db may yield an output volume level of 50 db. Table 400 may further suggest that an input volume level that is above 60 db may yield an output volume of a muted volume level. A muted volume level may be 0 db, 1 db, or the like. Additionally or alternatively, a muted volume level may yield no output. As can be appreciated, the output volume level may be lower than that of the input volume level (e.g., input volume level of 25 db, may yield output volume level of 20 db), may be higher than that of the input volume level (e.g., input volume level of 35 db may yield output volume level of 50 db), or the like. In some exemplary embodiments, as the input volume level increases, the output volume level may decrease, as is exemplified by the last two rows of Table 400, showing that for an input volume level in the range of 30 db-60 db, the output volume level is 50 db, and for a higher volume level (>60 db), the output volume level is in fact lower—a muted volume level. In some exemplary embodiments, Table 400 may be provided as part of the user's preferences. In some exemplary embodiments, the output volume level may be determined based on Table 400 together with additional factors, such as the interaction context. In some cases, the output defined by Table 400 may be modified to be taken into consideration with the interaction context. Additionally or alternatively, alternative tables such as Table 400 may be provided for different interactions context or a base table may be modified accordingly. For example, given an increased distance between the user and the speaker, the output level may be increased accordingly. As another example, given an increased distance between the user and the microphone, the input volume ranges may be modified accordingly. As another example, given a user who suffers from a hearing disability, the output volume level may be increased.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising steps executed by a processor:
   obtaining a vocal input from a user, wherein the vocal input is part of an interaction between the user and a voice-based interaction agent;
   measuring an input volume level of the vocal input;
   determining that the input volume level is affected by a facial direction of the user while providing the vocal input;
   determining an interaction context of the interaction between the user and the voice-based interaction agent;
   based on the vocal input and based on the interaction context, determining an output volume level of the voice-based interaction agent, wherein said determining the output volume level is configured to compensate for the facial direction of the user; and
   providing to the user an output of the voice-based interaction agent, wherein the output comprises a voice-based output having a volume level of the output volume level.

2. The method of claim 1,
   wherein said providing to the user the output is performed using a speaker;
   wherein said determining the interaction context comprises determining a distance of the user from the speaker; and
   wherein said determining the output level is performed based on the distance.

3. The method of claim 1, wherein the interaction context comprises a profile of the user, wherein said determining the output volume level is performed based on the profile of the user.

4. The method of claim 3, wherein the profile of the user comprises at least one of:
   a demographic attribute of the user;
   an interaction history of the user with the voice-based interaction agent; and
   a medical profile of the user.

5. A method comprising steps executed by a processor:
   obtaining a vocal input from a user, wherein the vocal input is part of an interaction between the user and a voice-based interaction agent;
   determining an interaction context of the interaction between the user and the voice-based interaction agent;
   wherein said determining the interaction context comprises:
      determining an input volume level of the vocal input;
      retrieving one or more historic records associated with the input volume level, wherein the one or more historic records are historic records of historic interactions between the user and the voice-based interaction agent, wherein each record comprises a historic output volume level and a user feedback of the user to the historic output volume level; and based on the one or more historic records, estimating that a target output volume level corresponds to positive user feedback, based on the vocal input and based on the interaction context, determining an output volume level of the voice-based interaction agent, wherein said determining the output volume level comprises utilizing the target output volume level as the output volume level; and providing to the user an output of the voice-based interaction agent, wherein the output comprises a voice-based output having a volume level of the output volume level.

6. The method of claim 1, wherein the interaction context comprises a surrounding context, wherein the surrounding context is indicative of an existence of one or more additional people in a surrounding of the user; and wherein said determining the output volume level of the voice-based interaction agent is performed based on the surrounding context.

7. The method of claim 1, wherein said determining the interaction context comprises determining a layout context, wherein the layout context comprises a layout of audio-absorption items in a surrounding of the voice-based interaction agent; and wherein said determining the output volume level of the voice-based interaction agent is performed based on the layout context.

8. The method of claim 1, wherein said determining the interaction context comprises determining an expected absorption of an audio wave emitted by the voice-based interaction agent before the audio wave reaches the user;

wherein said determining the output volume level of the voice-based interaction agent is performed based on the expected absorption.

9. A method comprising steps executed by a processor:

obtaining a vocal input from a user, wherein the vocal input is part of an interaction between the user and a voice-based interaction agent;

determining an interaction context of the interaction between the user and the voice-based interaction agent;

based on the vocal input and based on the interaction context, determining an output volume level of the voice-based interaction agent, wherein based on the vocal input being measured below a threshold volume level, said determining the output volume level of the voice-based interaction agent comprises determining the output volume level to comprise a muted volume level; and providing to the user an output of the voice-based interaction agent, wherein the output comprises a voice-based output having a volume level of the output volume level.

10. A non-transitory computer readable medium retaining program instructions, which program instructions when read by a processor, cause the processor to perform:

determining an input volume level of a vocal input from a user, wherein the vocal input is part of an interaction between the user and a voice-based interaction agent;

determining an estimated speech volume level of the user based on the input volume level and a context of the interaction between the user and the voice-based interaction agent;

determining an output volume level of the voice-based interaction agent based on the input volume level and the estimated speech volume level, wherein the output volume level is determined to reach the user in a volume that matches the estimated speech volume level; and providing to the user an output of the voice-based interaction agent, wherein the output comprises a voice-based output having a volume level of the output volume level.

11. A non-transitory computer readable medium retaining program instructions, which program instructions when read by a processor, cause the processor to perform:

obtaining a vocal input from a user, wherein the vocal input is part of an interaction between the user and a voice-based interaction agent;

determining an interaction context of the interaction between the user and the voice-based interaction agent;

based on the vocal input and based on the interaction context, determining an output volume level of the voice-based interaction agent; and providing to the user an output of the voice-based interaction agent, wherein the output comprises a voice-based output having a volume level of the output volume level, wherein the program instructions are further configured to cause the processor to measure an input volume level of the vocal input;

to determine that the input volume level is affected by a facial direction of the user while providing the vocal input, and wherein said determining the output volume level is configured to compensate for the facial direction of the user.

12. The non-transitory computer readable medium of claim 11, wherein the interaction context comprises a profile element of the user, wherein said determining the output volume level is performed based on the profile of the user, wherein the profile element is at least one of: a demographic attribute of the user, an interaction history of the user with the voice-based interaction agent, and a medical profile of the user.

13. The non-transitory computer readable medium of claim 11, wherein said determining the interaction context comprises analyzing a background noise; wherein said determining the output volume level is performed based on the background noise.

14. The non-transitory computer readable medium of claim 11, wherein the interaction context comprises a surrounding context, wherein the surrounding context is indicative of an existence of one or more additional people in a surrounding of the user; and wherein said determining the output volume level of the voice-based interaction agent is performed based on the surrounding context.

15. The non-transitory computer readable medium of claim 11, wherein said determining the interaction context comprises determining a layout context, wherein the layout context comprises a layout of audio-absorption items in a surrounding of the voice-based interaction agent; and wherein said determining the output volume level of the voice-based interaction agent is performed based on the layout context.

16. The method of claim 1, wherein the interaction context comprises a time of day, wherein said determining the output volume level comprises determining to mute the output volume level of the voice-based interaction agent during a defined time of day.

17. The method of claim 1, wherein the interaction context comprises a geolocation of the user, wherein said determining the output volume level comprises determining to mute the output volume level of the voice-based interaction agent based on the geolocation.

18. The method of claim 1, wherein said determining the output volume level is based on a mapping between input volume ranges of the vocal input to respective output volume levels defined for the voice-based output.

\* \* \* \* \*